US006425947B1

(12) United States Patent
Berlin et al.

(10) Patent No.: US 6,425,947 B1
(45) Date of Patent: Jul. 30, 2002

(54) COMPOSITION FOR FIRE-PROTECTION COATING

(75) Inventors: Alexandr A. Berlin; Nikolai A. Khalturinsky, both of Moscow; Tatyana A. Rudakova; Jury M. Evtushenko, both of Moskovskaya, all of (RU)

(73) Assignee: Isle Firestop Limited (GB)

( * ) Notice: Subject to any disclaimer, the term of this patent is extended or adjusted under 35 U.S.C. 154(b) by 0 days.

(21) Appl. No.: 09/831,695

(22) PCT Filed: Nov. 10, 1998

(86) PCT No.: PCT/RU98/00367
§ 371 (c)(1),
(2), (4) Date: Jul. 27, 2001

(87) PCT Pub. No.: WO00/27934
PCT Pub. Date: May 18, 2000

(51) Int. Cl.[7] .................. C09D 5/18; C09D 161/24; C09K 21/10
(52) U.S. Cl. ................. 106/18.13; 106/18.12; 106/287.23; 106/287.26; 252/601; 252/609
(58) Field of Search .................. 106/18.13, 287.23, 106/287.26, 18.12; 252/609, 601

(56) References Cited

U.S. PATENT DOCUMENTS

| 3,639,299 A | * | 2/1972 | MacDowall | 427/389.7 |
| 4,324,835 A | * | 4/1982 | Keen | 521/54 |
| 4,529,467 A | | 7/1985 | Ward et al. | 156/307.3 |
| 6,270,694 B1 | * | 8/2001 | Blount | 252/607 |

FOREIGN PATENT DOCUMENTS

| DE | 196 00 877 | 7/1997 |
| GB | 755551 | 8/1956 |
| GB | 1462828 | 1/1977 |
| RU | 2028348 | 2/1995 |
| RU | 2065463 | 8/1996 |
| RU | 2119516 | 9/1998 |

OTHER PUBLICATIONS

Derwent Abstract No. 1975–38243W, abstract of Japanese Patent Specification No. 49–099333 (Sep. 1974).*
Derwent Abstract No. 1985–151413, abstract of Soviet Union Patent Specification No. 1126584 (Nov. 1984).*
Derwent Abstract No. 1995–282036, abstract of Russian Federation Patent Specification No. 2028348 (Feb. 1995).*
Derwent Abstract No. 1997–177644, abstract of Russian Federation Patent Specification No. 2065463 (Aug. 1996).*
Derwent Abstract No. 1998–109022, abstract of Russian Federation Patent Specification No. 2084476 (Jul. 1997).*
L.N. Mashlyakovsky et al., 4.2 Principles of Compiling Prescriptions for Lacquer and Paint Materials for Use on Foaming Coatings, Russian Technical Journal; pp. 132–133. (no date).
Database WPI Section Ch, Week 199302; Derwent Publications Ltd., London, GB; Class A1, AN 1993–016001;XP002187045.

* cited by examiner

Primary Examiner—Anthony Green
(74) Attorney, Agent, or Firm—Sheridan Ross P.C.

(57) ABSTRACT

The invention relates to compositions for the application of coatings primarily to wood and metal structures and installations, which have high fireproofing and thermal insulation properties, and can be used in construction, the aircraft industry, rail transport and shipbuilding. The composition includes a foaming system, which itself includes pentaerythritol or sorbitol, ammonium polyphosphate, boric acid, urea, filler and pigment, and also resin as a binder.

18 Claims, No Drawings

COMPOSITION FOR FIRE-PROTECTION COATING

TECHNOLOGY FIELD

The invention relates to compositions for application as coatings, primarily to wooden and metal structures and installations. The compositions, which have good fire protection and thermal insulation properties, can be used in construction, the aircraft industry, rail transport, shipbuilding and other fields where wooden and metal structures and installations are found.

PRIOR ART

One of the known forms of fireproofing compositions comprises compositions based on a foaming system, which foam at high temperatures (250–300° C.), forming a thermal-insulation coke layer, the thickness of which is 20–25 times that of the original coating. The coke layer which forms during a fire has high thermal insulation properties, so that it prevents the spread of heat through the protected structure. Foaming fireproofing coatings are very effective, but the compositions known so far have a number of defects.

Most of the known coatings include organic solvents (German Patent No. 2704897, IPC C09D 5/18, 1986, USSR Authorship Certificate No. 452224 C09D 5/18, 1972), which considerably increases the fire risk in applying the coatings, and also makes them more toxic.

To improve their fire resistance, halogen-containing compounds are introduced into the known compositions (German Patent No. 2704897, IPC C09D 5/18, 1986), but this makes the coatings highly toxic, particularly in the conditions of a fire.

Most known compositions contain dicyanodiamide as a gas-former (USSR Authorship Certificate No. 1130586, C09K 21/14, 1983, USSR Authorship Certificate No. 1126584, C09D 5/18, C09D 3/52, C09K 21/14, 1982), which makes them toxic and unacceptable from the ecological point of view.

There is a known composition including amino-containing (melamine-formaldehyde) resin, sodium salt of carboxymethyl cellulose, dicyanodiamide, ammonium phosphate, filler and water (USSR Authorship Certificate No. 1126584, C09D 5/18, C09D 3/52, C09K 21/14, 1982), which does not contain halogen-containing compounds or organic solvents, but which, like most other compositions, contains dicyanodiamide as a gas former, so this too is toxic and ecologically harmful.

Another significant problem with known compositions for fireproofing coatings is the low adhesion of the coating to the surface being protected (wood), which leads to cracks and breaches in the coating, and sometimes even to it peeling off from the surface being protected (USSR Authorship Certificate No. 551436, IPC E04F 13/02, 1975), and thus to a reduction in its heat-resistant and thermal insulation properties.

The closest composition for a fireproof coating to the proposed one in its technical nature and in the results it achieves is a composition including water-soluble urea-formaldehyde resin, para-tret, butylphenolformaldehyde resin, ammonium polyphosphate, polyhydric alcohol (pentaerythritol), triazine derivatives, filler and water (RF Patent No. 2065463, cl. C09D 5/18, 1996).

This composition contains no highly toxic components, but has the following faults. The composition is characterised by low-technology production, which firstly leads to a deterioration in its fireproofing properties, and secondly to unjustified additional energy and material costs. Furthermore, its results are not reproducible.

To produce the known composition, a composition is obtained from triazine derivatives by heating carbamide (for 1–1.5 hours) in the presence of phosphoric acid and its ammonia salt, which is then mixed with the other components of the composition (other than ammonium polyphosphate, kaolin and water) and is ground in a ball mill. The ammonium polyphosphate is added to the composition immediately before its application, without grinding it in the ball mill, which inevitably means that it is unevenly distributed in the composition, causing acute local falls in fire resistance, which is confirmed by data on fire-resistant steel structures: 45.5–49 min. for coating thickness 2.6–2.8 mm (and one priming coat), whereas the standard requirement is 60 min. for a coating thickness of 1.4 mm. It may adhere well due to successful priming, but this is no guarantee of fire resistance, since the coating can still crack at high temperatures. The quite good data on loss of mass in burning are explained by the high thickness of the coating.

A serious fault is the high consumption of the composition when the coating is applied: for wood 0.485–0.515 kg/m$^2$, for metal 3.5 kg/m$^2$. Furthermore, this composition is characterised by a short life: six months without the addition of polyphosphate.

SUBSTANCE OF THE INVENTION

The main aim of this invention is the creation of an ecologically clean and non-toxic composition for a fireproof coating which has both high fire-resistance properties and better adhesion to the surfaces being protected.

Another aim of the invention is the creation of a composition for a fireproof coating, which in addition to the above properties, is also easy to produce and can be stored for a long time.

Another aim of the invention is the creation of a composition for a fireproof coating which has the above properties at a low rate of consumption.

These aims are met by the proposed foaming composition for a fireproof coating, which includes, as the foaming system:

polyhydric alcohol
ammonium polyphosphate
urea
ammonium chloride
boric acid
filler
and resin as a binder.

| | |
|---|---|
| polyhydric alcohol | 16.4–21.6 |
| ammonium polyphosphate | 39.0–45.4 |
| urea | 22.2–23.6 |
| ammonium chloride | 6.0–8.0 |
| boric acid | 6.0–8.0 |
| filler | 3.6–4.6 |

As well as these components, pigment in quantity 2.0–3.0 parts by weight may be introduced into the foaming system.

The proposed compound was developed on the basis of experimental studies of various non-toxic gas formers and combinations of them. The most effective compositions were those containing pentaerythritol and sorbitol (as the polyhydric alcohol) in combination with ammonium polyphosphate. It was also discovered that the use of boric acid not only raises the efficiency of gas formation, but also increases the strength of bonding to the surface being protected, and prevents cracking of the protective layer in conditions of the effect of high temperatures and fire.

The following can be used as the binder resin, which is introduced into the composition in roughly the same weight percentage as the foaming system:

urea-formaldehyde resin (preferably in the form of a 55–65% aqueous solution);

carbamide resin in the form of an aqueous solution;

epoxy resin with ammoniate hardener;

oligoesterepoxide;

oligoestercyanuratimide;

organosilicon resins;

pentaphthalate and hyphaphthalate resins.

Examples of the Implementation of the Invention

The composition was prepared as follows. Foaming system (dry components): polyatomic alcohol (pentaerythritol or sorbitol), ammonium polyphosphate, boric acid, ammonium chloride, filler (talc) and pigment (titanium dioxide) were loaded into a ball mill and ground for 10–35 min. After this, the ground dry components were mixed in a ratio by weight of roughly 1:1 with binder, for which resin was used. A uniform mass was obtained, which could be applied by any method (spatula, brush, roller, spray) to the surface being protected. The consumption of the composition for wood was 0.2–0.3 kg/m² (coating thickness 0.18–0.25 mm), for metal 1.5–2.0 kg/m² (coating thickness 1.4–1.6 mm). Drying time at 20° C. and relative air humidity 65% was 36 hours.

EXAMPLE 1

The aforementioned method was used to prepare a foaming system including:

| | |
|---|---|
| pentaerythritol | 9.2 |
| ammonium polyphosphate | 21.4 |
| urea | 12.8 |
| ammonium chloride | 3.1 |
| boric acid | 3.0 |
| filler (talc) | 1.9 |
| pigment (titanium dioxide) | 1.0 |

The above ground dry components of the fireproofing composition were dissolved in an aqueous solution of urea-formaldehyde resin in a mass ratio of 1:1.

EXAMPLE 2

In the same way as Example 1, a composition containing the following was prepared:

| | |
|---|---|
| sorbitol | 9.2 |
| ammonium polyphosphate | 21.4 |
| urea | 12.8 |
| ammonium chloride | 4.0 |
| boric acid | 3.0 |
| talc | 1.8 |
| pigment (titanium dioxide) | 1.5 |

EXAMPLE 3

A composition, including:

| | |
|---|---|
| pentaerythritol ammonium polyphosphate | 21.4 |
| urea | 12.8 |
| ammonium chloride | 4.0 |
| boric acid | 3.0 |
| talc | 1.8 |
| pigment | 1.5 | was mixed in mass ratio 1:1 with a freshly-prepared system of resin ED-20 (epoxydiane resin with epoxy number 20)+ PEPA (polyethylene polyamine) (one part by weight of PEPA to 10 of ED-20).

EXAMPLE 4

A composition including:

| | |
|---|---|
| sorbitol | 9.2 |
| ammonium polyphosphate | 21.4 |
| urea | 12.8 |
| ammonium chloride | 4.0 |
| boric acid | 3.0 |
| talc | 1.8 |
| pigment | 1.5 | was mixed in mass ration 1:1 with a freshly-prepared system of resin ED-20+PEPA (one part by weight of PEPA to 10 of ED-20).

EXAMPLE 5

A composition including:

| | |
|---|---|
| pentaerythritol | 9.2 |
| ammonium polyphosphate | 21.4 |
| urea | 12.8 |
| ammonium chloride | 4.0 |
| boric acid | 3.0 |
| talc | 1.8 |
| pigment | 1.5 | as mixed in mass ratio 1:1 with a 50% solution of oligoesterepoxide mixed with xylene white spirit (1:1).

EXAMPLE 6

A composition including:

| | |
|---|---|
| sorbitol | 9.2 |
| ammonium polyphosphate | 21.4 |
| urea | 12.8 |
| ammonium chloride | 4.0 |
| boric acid | 3.0 |
| talc | 1.8 |
| pigment | 1.5 | was mixed in mass ratio 1:1 with a 50% solution of oligoesterepoxide mixed with xylene white spirit (1:1).

Study of the finished fireproofing coating.

Specimens of the coating were applied to metal and wood surfaces. After drying, the effectiveness of the fire protection was found by the standard method. The thickness of the coating, the coke ratio and the loss of mass when burned were found. Table 1 shows the results of tests for wooden specimens, depending on the degree of dispersion of the powder.

Similar results were obtained for tests on metal.

TABLE 1.

| Mill running time, min. | Thickness of coating, mm | Coke ratio | Loss of mass when burned, % |
|---|---|---|---|
| 10 | 0.91 | 21.4 | 8.54 |
| 20 | 0.89 | 20.59 | 9.60 |
| 30 | 0.62 | 28.90 | 5.50 |
| 35 | 0.81 | 12.32 | 11.39 |

Table 2, as an example, shows the fireproofing characteristics of the composition (for wood) for different ratios of components. Loss of mass when burned was 4–6%. Tests in accordance with OST 1 90094-85 (exposure of wooden specimens 7 mm thick in a ceramic tube heated to 800° C. for 60 seconds) gave the following results: duration of residual combustion and glow 0 sec., height of burn through 1 mm, grading: low combustibility. The strength of adhesion to the wood was 0.18–0.21 MPa. The coke ratio was 20–25%. The coke cap did not crack under the influence of the fire and high temperatures. The coating is resistant to oil and petrol. It is non-toxic and ecologically safe.

4. Composition in accordance with claim 1, wherein it contains pentaerythritol as the polyhydric alcohol.

5. Composition in accordance with claim 1, wherein it contains sorbitol as the polyhydric alcohol.

6. Composition in accordance with claim 1, wherein it includes an aqueous solution of urea-formaldehyde resin as the binder.

7. Composition in accordance with claim 6, wherein the aqueous solution of urea-formaldehyde resin has a concentration of 55–65%.

8. Composition in accordance with claim 1, wherein it includes an aqueous solution of carbamide resin as the binder.

9. Composition in accordance with claim 1, wherein it includes epoxy resin with ammoniate hardener.

10. Composition in accordance with claim 1, wherein it includes oligoesterepoxide as the binder.

11. Composition in accordance with claim 1, wherein it includes oligoestercyanuratimide as the binder.

12. Composition in accordance with claim 1, wherein it includes organosilicon resin as the binder.

13. Composition in accordance with claim 1, wherein it includes pentaphthalate or hyphaphthalate resin as the binder.

14. Foaming system of a composition for a fireproofing coating, including, in parts by weight:

TABLE 2

Ratios of components (parts by weight) and fireproofing characteristics of a composition for a fireproofing coating, containing 50 parts by weight of a 60% aqueous solution of urea-formaldehyde resin

| | Components | | | | | | | Characteristics | | | | |
|---|---|---|---|---|---|---|---|---|---|---|---|---|
| No. of example | penta-erythrite | ammonium poly-phosphate | urea | talc | $NH_4Cl$ | $H_3BO_3$ | pigment | Loss of mass on burning, % | Residual combustion time, sec. | Height of burning through, mm | Strength of adhesion to wood, MPa | Coke ratio, % |
| 7 | 8.2 | 19.5 | 11.8 | 1.8 | 3.0 | 3.0 | 1.0 | 5.0 | 0 | 1.0 | 0.18 | 24 |
| 8 | 9.5 | 22.7 | 11.5 | 2.3 | 3.0 | 4.0 | 1.0 | 4.6 | 0 | 1.0 | 0.21 | 20 |
| 9 | 10.8 | 20.1 | 11.1 | 2.0 | 4.0 | 2.8 | 1.5 | 4.0 | 0 | 1.0 | 0.20 | 25 |
| 10 | 8.0 | 19.0 | 11.0 | 2.0 | 3.0 | 2.0 | 1.0 | 5.6 | 0.4 | 1.2 | 0.16 | 16 |
| 11 | 11.0 | 11.0 | 11.5 | 2.0 | 4.0 | 3.0 | 1.0 | 5.2 | 0.2 | 1.1 | 0.17 | 19 |

What is claimed is:

1. Composition for a fireproofing coating, including a foaming system and a binder in the form of resin, wherein the foaming system includes, in parts by weight:

| polyhydric alcohol | 16.4–21.6, |
|---|---|
| ammonium polyphosphate | 39.0–45.4, |
| urea | 22.2–23.6 |
| ammonium chloride | 6.0–8.0, |
| boric acid | 6.0–8.0, and |
| filler | 3.6–4.6. |

2. Composition in accordance with claim 1, wherein the foaming system further contains pigments in quantity parts by weight 2.0–3.0.

3. Composition in accordance with claim 1, wherein the foaming solution and resin are in substantially equal ratio of parts by weight.

| polyhydric alcohol | 16.4–21.6, |
|---|---|
| ammonium polyphosphate | 39.0–45.4, |
| urea | 22.2–23.6 |
| ammonium chloride | 6.0–8.0, |
| boric acid | 6.0–8.0, and |
| filler | 3.6–4.6. |

15. Foaming system in accordance with claim 14, wherein it also contains pigment in quantity parts by weight 2.0–3.0.

16. Foaming system in accordance with claim 14, wherein it contains talc as the filler.

17. Foaming system in accordance with claim 14, wherein it contains pentaerythritol as the polyhydric alcohol.

18. Foaming system in accordance with claim 14, wherein it contains sorbitol as the polyhydric alcohol.

* * * * *

UNITED STATES PATENT AND TRADEMARK OFFICE
CERTIFICATE OF CORRECTION

PATENT NO.     : 6,425,947 B1
DATED          : July 30, 2002
INVENTOR(S)    : Berlin et al.

It is certified that error appears in the above-identified patent and that said Letters Patent is hereby corrected as shown below:

Column 3,
Line 14, the term "ammoniate" should read -- amine --;
Line 16, the term "oligoestercyanuratimide" should read -- oligoesterisocyanurate --;
Line 18, the term "pentaphthalate" should read -- pentaphthalic --;
Line 18, the term "hyphaphthalate" should read -- glyptal --;

Column 4,
Line 47, please correct the word "as" to -- was --;
Lines 48 and 63, please insert a colon -- : -- after the word "xylene" and insert the word -- mixture -- at the very end of the line before the period;

Column 6,
Line 16, the term "ammoniate" should read -- amine --;
Line 20, the term "oligoestercyanuratimide" should read -- oligoesterisocyanurate --;
Line 24, the term "pentaphthalate" should read -- pentaphthalic --; and
Line 24, the term "hyphaphthalate" should read -- glyptal --.

Signed and Sealed this

Twenty-fifth Day of March, 2003

JAMES E. ROGAN
*Director of the United States Patent and Trademark Office*